US012716507B2

(12) United States Patent
Culler et al.

(10) Patent No.: US 12,716,507 B2
(45) Date of Patent: Aug. 25, 2026

(54) BI-STABLE VALVE

(71) Applicant: Honeywell International Inc., Charlotte, NC (US)

(72) Inventors: Wyatt Culler, Berne, IL (US); Andrew Collier, Arlington Heights, IL (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/598,926

(22) Filed: Mar. 7, 2024

(65) Prior Publication Data

US 2025/0283540 A1 Sep. 11, 2025

(51) Int. Cl.
*F16K 11/00* (2006.01)
*F23K 5/00* (2006.01)

(52) U.S. Cl.
CPC .............. *F16K 11/00* (2013.01); *F23K 5/002* (2013.01); *F23K 2900/05002* (2013.01); *Y10T 137/206* (2015.04)

(58) Field of Classification Search
CPC ........... Y10T 137/206; Y10T 137/2065; Y10T 137/2224; Y10T 137/2273
See application file for complete search history.

(56) References Cited

U.S. PATENT DOCUMENTS 1,905,733 A 4/1933 William et al.
3,423,990 A * 1/1969 Martin ................ G01M 3/3281 73/45.1
3,472,225 A * 10/1969 Burns ................... A61M 16/00 128/DIG. 10
3,540,463 A * 11/1970 Meyer ....................... F15C 1/04 137/829
3,690,338 A * 9/1972 Swartz ...................... F15C 1/08 137/841
5,067,509 A 11/1991 Hunter
7,080,661 B1 * 7/2006 Ayer ....................... B05B 17/08 137/550
8,951,039 B2 2/2015 Yoshida et al.
11,215,121 B2 1/2022 Stevenson
2019/0242303 A1 8/2019 Menheere et al.
2022/0168697 A1 * 6/2022 Zimmerman ......... B01F 23/238

FOREIGN PATENT DOCUMENTS

CA 3032170 A1 8/2019

OTHER PUBLICATIONS

Tesar et al., "No. Moving-Part Valve for Automatic Flow Switching," Chemical Engineering Journal, vol. 162, pp. 278-295, 2010. Accepted Apr. 15, 2010.
Wikipedia, The Conada Effect, 14 pages, Accessed Jan. 8, 2024.

* cited by examiner

*Primary Examiner* — Robert K Arundale
(74) *Attorney, Agent, or Firm* — Seager, Tufte & Wickhem, LLP

(57) ABSTRACT

A bi-stable valve includes a valve body that has a valve inlet, a first valve outlet, and a second valve outlet. The valve body defines a preferential wall that is convex in shape that draws a flow passing through the valve inlet primarily towards the first valve outlet at a low back pressure at the first valve outlet. The valve body defines a second wall that is convex in shaped to draw the flow passing through the valve inlet more towards the second valve outlet as the back pressure at the first valve outlet increases.

16 Claims, 5 Drawing Sheets

BI-STABLE VALVE

TECHNICAL FIELD

The present disclosure relates generally to valves, and more particularly to valves that do not have any moving parts.

BACKGROUND

Valves are used in a variety of different applications, including regulating the flow of fuel for a fuel burner. Some fuel burners, such as many industrial burners, utilize fuel staging to increase efficiency and reduce harmful combustion products such as NOx and CO. Fuel staging works by using two or more fuel circuits that change the spatial location of the fuel injection. A disadvantage of this technique is that it often requires an additional electro-mechanical valve for control, thereby adding complexity to the system. What would be desirable are improved valves that minimize cost and complexity. What would be desirable are improved valves such as fuel valves that do not require any moving parts or electrical power. What would be desirable are fuel valves that can turn staged fuel on or off at present pressure levels based on the geometry of the valve, as well as fuel valves that can be used to increase burner turndown by turning off burner nozzles in a multiple nozzle system when the commanded firing rate decreases below a threshold.

SUMMARY

The present disclosure relates generally to valves, and more particularly to zero moving parts valves used in burners. An example may be found in a bi-stable valve. The bi-stable valve includes a valve body that defines a valve inlet, a flow control passage downstream of the valve inlet, a first valve outlet, and a second valve outlet, where the first valve outlet and the second valve outlet are both downstream of the flow control passage and are both fed by the flow control passage. In some cases, the first valve outlet is situated toward a first side of the flow control passage and the second valve outlet is situated toward a second opposing side of the flow control passage. The flow control passage is defined in part by a preferential wall of the valve body, wherein the first preferential of the valve body extends along the first side of the flow control passage between the valve inlet and the first valve outlet. The flow control passage is also defined in part by a second wall of the valve body, wherein the second wall of the valve body extends along the second side of the flow control passage between the valve inlet and the second valve outlet. At least one of the preferential wall and the second wall of the valve body have a convex shape over at least a major length of the flow control passage.

Another example may be found in a bi-stable valve that includes a valve inlet, a flow control passage downstream of the valve inlet, a first valve outlet, and a second valve outlet. The first valve outlet is situated toward a first side of the flow control passage and the second valve outlet is situated toward a second opposing side of the flow control passage. The first valve outlet and the second valve outlet are both downstream of the flow control passage and are both fed by the flow control passage. The flow control passage is defined in part by a primary flow surface on the first side of the flow control passage and a secondary flow surface on the second side of the flow control passage, wherein a flow though the valve inlet primarily flows along the primary flow surface and to the first valve outlet at a first backpressure at the first valve outlet, and the flow though the valve inlet primarily flows along the secondary flow surface and to the second valve outlet at a second backpressure at the first valve outlet, wherein the second backpressure is higher than the first backpressure. The primary flow surface has a convex shape over at least a major length of the flow control passage. In some cases, the secondary flow surface also has a convex shape over at least a major length of the flow control passage.

Another example may be found in a bi-stable valve that includes a valve body. The valve body includes a valve inlet, a first valve outlet, and a second valve outlet. The valve body defines a preferential wall that is convex in shape that draws a flow through the valve inlet primarily towards the first valve outlet, the first valve outlet having a back pressure that is dependent on the flow through the first valve outlet. The valve body defines a second wall that is convex in shaped to draw the flow through the valve inlet more towards the second valve outlet as the back pressure at the first valve outlet increases.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
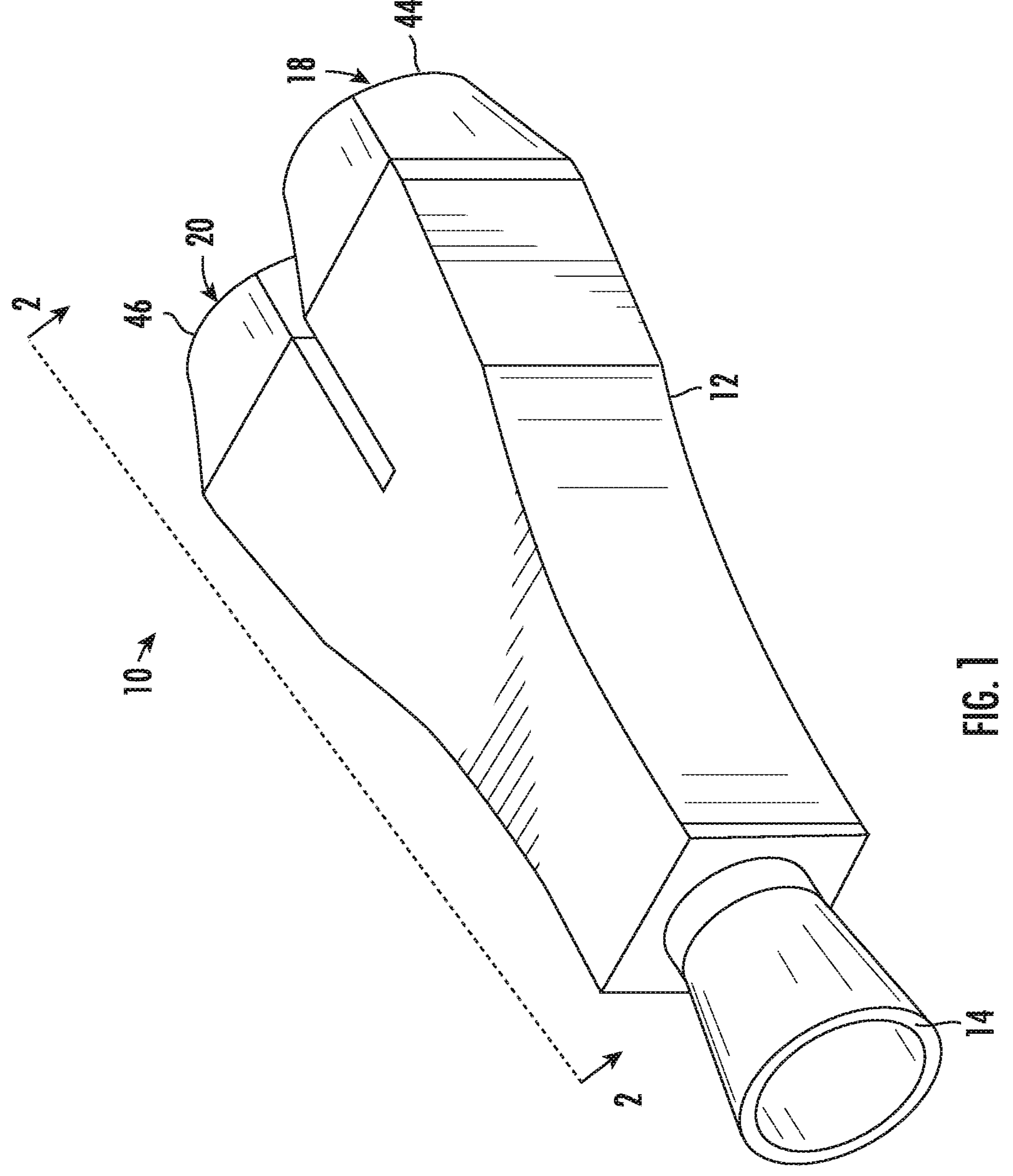
FIG. 1 is a perspective view of an illustrative bi-stable valve.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

Figure 2:
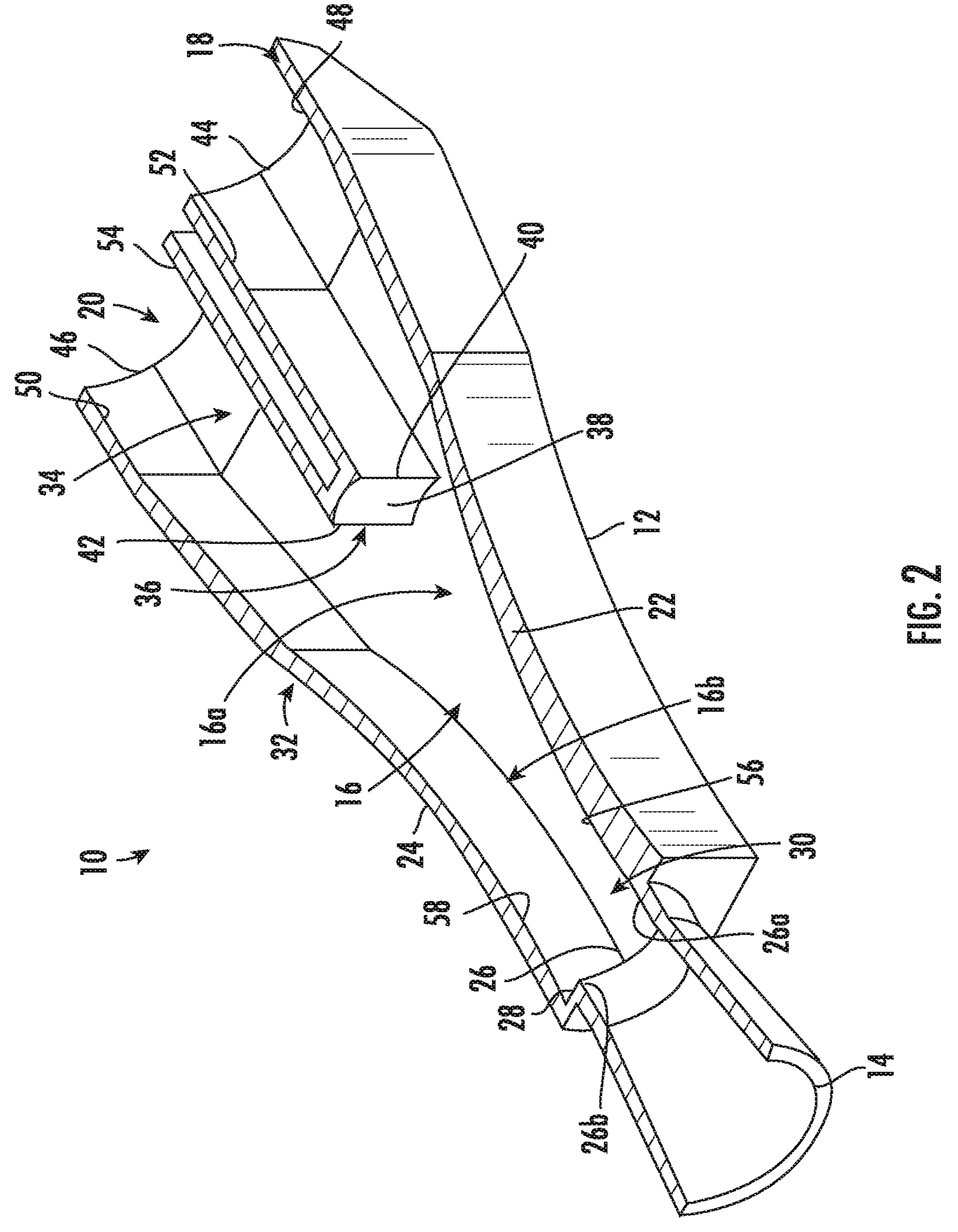
FIG. 2 is a perspective cross-sectional view taken along the line 2-2 of FIG. 1.

FIG. 1 is a perspective view of an illustrative bi-stable valve 10, and FIG. 2 is a cross-sectional view thereof taken along the line 2-2 of FIG. 1. The bi-stable valve 10 may be used with any fluid, such as air or fuel. The bi-stable valve 10 relies on the Coanda effect to control fluid flow through the bi-stable valve 10 as a result of varied back pressure. At low back pressure at the first valve outlet 18, the first valve outlet 18 is the preferential outlet and a majority of the flow exits using the first valve outlet 18. As the back pressure increases on the first valve outlet 18 the adverse pressure gradient causes the flow to detach from the preferential wall 22 and switch to the second wall 24. In this configuration, with high back pressure on the first valve outlet 18, the preferential exit valve switches to the lower back pressure second valve outlet 20. In the example show, the bi-stable valve 10 includes a valve body 12. The valve body 12 defines a valve inlet 14, a flow control passage 16 that is downstream of the valve inlet 14, the first valve outlet 18 and the second valve outlet 20. As can be seen, the first valve outlet 18 and the second valve outlet 20 are each downstream of the flow control passage 16 and both are fed by the flow control passage 16.

The first valve outlet 18 may be considered as being situated towards a first side 16*a* of the flow control passage 16 and the second valve outlet 20 may be considered as being situated towards a second side 16*b* of the flow control passage 16. The flow control passage 16 is defined in part by a preferential wall 22 that extends along the first side 16*a* of the flow control passage 16 between the valve inlet 14 and the first valve outlet 18. The flow control passage 16 is also defined in part by a second wall 24 that extends along the second side 16*b* of the flow control passage 16 between the valve inlet 14 and the second valve outlet 20. In some cases, at least one of the preferential wall 22 and the second wall 24 of the valve body 12 has a convex shape over at least a major length of the flow control passage 16. In some cases, as shown, both the preferential wall 22 and the second wall 24 of the valve body 12 may have a convex shape over at least a major length of the flow control passage 16. In some instances, the convex shape of the preferential wall 22 of the valve body 12 may have a greater cumulative curve over the length of the flow control passage 16 than the second wall 24 of the valve body 12. Relative to a wall having a flat or planar shape, having a convex shape helps increase the pulling force that is applied to the flow stream toward the respective wall, which may allow for a more effective and compact overall design.

In some cases, the valve inlet 14 has a valve inlet length that terminates downstream at a valve inlet orifice 26. The second wall 24 of the valve body 12 that extends along the second side 16*b* of the flow control passage 16 may be outwardly offset towards the second side 16*b* of the flow control passage 16 relative to the valve inlet orifice 26 by an offset amount. This can be seen as a step 28 between the valve inlet orifice 26 and the second wall 24 of the valve body 12. The relative dimensions of the step 28 may be varied, depending on various properties of the fluids expected to be used with the bi-stable valve 10 and the expected flow rates. In some instances, the valve inlet 14 tapers inward along at least a major length of the valve inlet 14 towards the valve inlet orifice 26.

In some cases, the flow control passage 16 may have an upstream end 30 that is adjacent the valve inlet 14 and a downstream end 32 that feeds the first valve outlet 18 and the second valve outlet 20. The first valve outlet 18 and the second valve outlet 20 may be separated by a valve outlet separating wall 34. The valve outlet separating wall 34 extends toward the valve inlet 14 and terminates at a terminating end 36 that is positioned at or before the downstream end 32 of the flow control passage 16. In some cases, as shown, the terminating end 36 may define a splitter tip. The splitter tip may include a bi-cuspid nose having a concave surface 38 between first and second cusps 40 and 42. In some instances, the valve inlet orifice 26 has a first side 26*a* that is adjacent the first side 16*a* of the flow control passage 16 and a second side 26*b* that is adjacent the second side 16*b* of the flow control passage 16, with a valve inlet orifice width defined between the first side 26*a* and the second side 26*b*. The splitter tip (terminating end 36) may be spaced downstream of the valve inlet orifice 26, downstream of the flow control passage 16, and centered with respect to the valve inlet orifice width.

In some instances, the first valve outlet 18 has a first valve outlet length and terminates at a first valve outlet orifice 44. The second valve outlet 20 has a second valve outlet length and terminates at a second valve outlet orifice 46. The first valve outlet 18 may be defined in part by a first outside wall 48 that is adjacent to and downstream of the first side 16*a* of the flow control passage 16, the first outside wall 48 extending along the first valve outlet length and has a non-convex shape over at least a major length of the first valve outlet length. The first valve outlet 18 may meet the downstream end of the first side 16*a* of the flow control passage 16 adjacent the splitter tip (terminating end 36). The second valve outlet 20 may be defined in part by a second outside wall 50 that is adjacent to and downstream of the second side 16*b* of the flow control passage 16, the second outside wall 50 extending along the second valve outlet length and has a non-convex shape over at least a major length of the second valve outlet length. The second valve outlet 20 may meet the downstream end of the second side 16*b* of the flow control passage 16 adjacent the splitter tip (terminating end 36).

In some cases, the first valve outlet 18 may be defined in part by a first valve outlet separating wall 52 that is on an opposing side of the first valve outlet 18 from the first outside wall 48, wherein the first valve outlet separating wall 52 may be planar over at least a major length of the first valve outlet length. The second valve outlet 20 may be defined in part by a second valve outlet separating wall 54 that is on an opposing side of the second valve outlet 20 from the second outside wall 50, wherein the second valve outlet separating wall 54 may be planar over at least a major length of the second valve outlet length. In some cases, for example, the first outside wall 48 extending along the first valve outlet length may be planar over at least a major length of the first valve outlet length and the second outside wall 50 extending along the second valve outlet length may be planar over at least a major length of the second valve outlet length.

In some instances, the flow control passage 16 may be defined in part by a primary flow surface 56 on the first side 16*a* of the flow control passage 16 and a secondary flow surface 58 on the second side 16*b* of the flow control passage 16. In operation, a flow though the valve inlet 14 primarily flows along the primary flow surface 56 and to the first valve outlet 18 at a first back pressure (e.g. low back pressure) at the first valve outlet 18. However, at a second back pressure (e.g. high back pressure) at the first valve outlet 18, the flow though the valve inlet 14 primarily flows along the secondary flow surface 58 and to the second valve outlet 20, wherein the second back pressure is higher than the first back pressure. As shown, the primary flow surface 56 has a convex shape over at least a major length of the flow control passage 16. In some cases, the secondary flow surface 58 may have a convex shape over at least a major length of the flow control passage 16. In some instances, the convex shape of the primary flow surface 56 has a greater cumulative curve over the length of the flow control passage 16 than the secondary flow surface 58. Moreover, the secondary flow surface 58 may be outwardly offset toward the second side 16*b* of the flow control passage 16 relative to the valve inlet 14 by an offset amount (e.g. by an offset amount that is greater than an offset amount that the primary flow surface 56 is outwardly offset toward the first side 16*a* of the flow control passage 16 relative to the valve inlet 14). In the example shown, the offset amount that the primary flow surface 56 is outwardly offset toward the first side 16*a* of the flow control passage 16 relative to the valve inlet 14 is zero.

Figure 3:
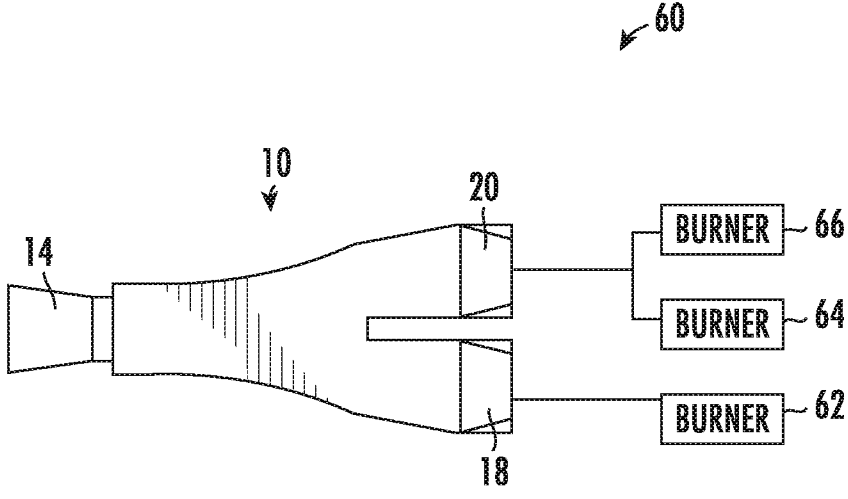
FIG. 3 is a schematic block diagram of an illustrative burner system employing the illustrative bi-stable valve of FIG. 1.

FIG. 3 is a schematic block diagram showing an illustrative burner system 60 that includes the illustrative bi-stable valve 10. The first valve outlet 18 is shown fluidly coupled with a first burner 62. The second valve outlet 20 is shown fluidly coupled with a second burner 64 and with a third burner 66. When the back pressure at the first valve outlet 18 is low, fuel will flow predominantly through the first valve outlet 18 and thus to the first burner 62. When the back pressure at the second valve outlet 20 is increased beyond a threshold, fuel will flow predominantly through the second valve outlet 20 and thus to the second burner 64 and the third burner 66. This is accomplished with no moving parts.

Figure 4:
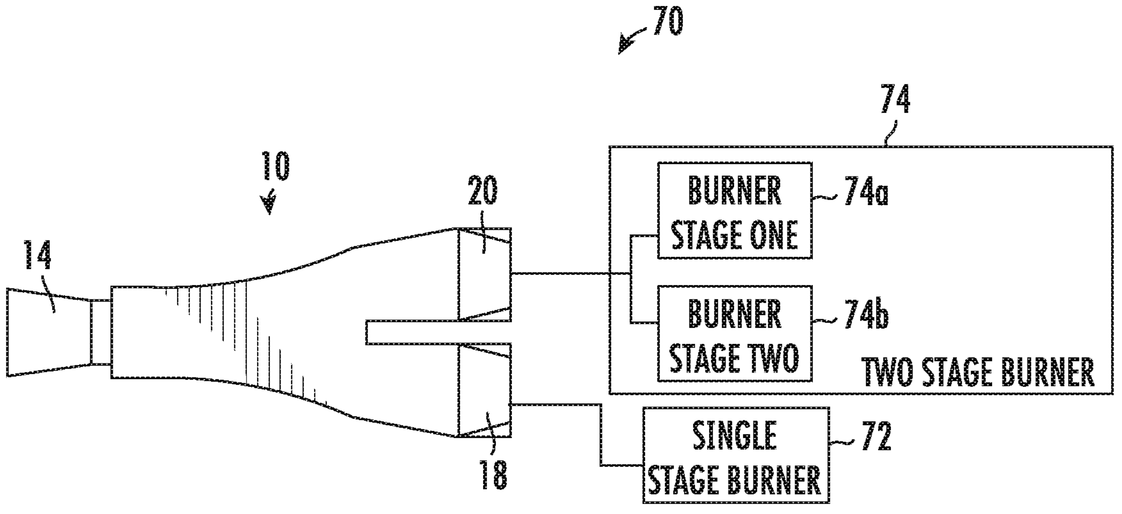
FIG. 4 is a schematic block diagram of an illustrative burner system employing the illustrative bi-stable valve of FIG. 1.

FIG. 4 is a schematic block diagram showing an illustrative burner system 60 that includes the illustrative bi-stable valve 10. The first valve outlet 18 is shown fluidly coupled with a single stage burner 72. The second valve outlet 20 is shown fluidly coupled with a two-stage burner 74 that has a burner stage one 74*a* and a burner stage two 74*b*. When the back pressure at the first valve outlet 18 is low, fuel will flow predominantly through the first valve outlet 18 and thus to the single stage burner 72. When the back pressure at the second valve outlet 20 is increased beyond a threshold, fuel will flow predominantly through the second valve outlet 20 and thus to both stages 74*a* and 74*b* of the two-stage burner 74.

Figure 5:
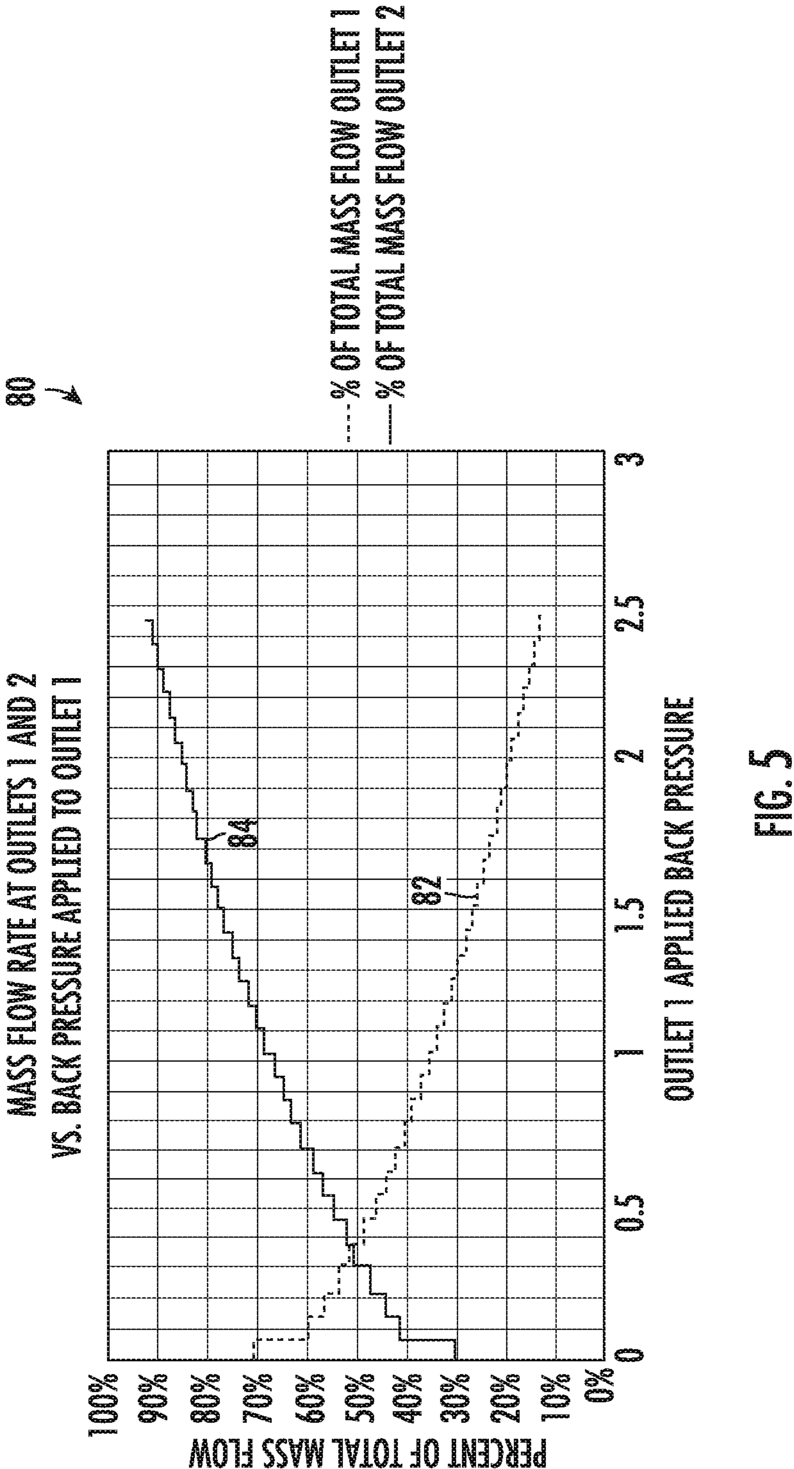
FIG. 5 is a graph showing a simulated percentage of mass flow through the first valve outlet 18 and the second valve outlet 20 of the illustrative bi-stable valve of FIG. 1 as a function of back pressure at the first valve outlet 18.

FIG. 5 is a graphical representation 80 of simulated test data showing how the illustrative bi-stable valve 10 responds to changing back pressure at the first valve outlet 18. The flow at the valve inlet 14 was set at 1000 SCFM (standard cubic feet per minute) of air and 100 SCFM of natural gas. A plotted line 82 shows that at no back pressure at the first valve outlet 18, seventy percent of the mass flowing through the bi-stable valve 10 exited the first valve outlet 18 and thirty percent of the mass flowing through the bi-stable valve 10 exited the second valve outlet 20. As the back pressure at the first valve outlet 18 increased, the ratios change. At a back pressure of 0.3 inches WC (inches water column) at the first valve outlet 18, about fifty percent of the mass flowing through the bi-stable valve 10 exited the first valve outlet 18 and about 50 percent of the mass flowing through the bi-stable valve 10 exited the second valve outlet 20. At a back pressure of 2.5 inches WC at the first valve outlet 18, about ten percent of the mass flowing through the bi-stable valve 10 exited the first valve outlet 18 and about ninety percent of the mass flowing through the bi-stable valve 10 exited the second valve outlet 20. These flow characteristics of the bi-stable valve 10 can be tuned for a particular application based on various design parameters including, for example, the size of the first valve outlet orifice 44 and the size of the second valve outlet orifice 46, the rate of downstream expansion of the flow control passage between the valve inlet 14 to the first valve outlet 18 and the second valve outlet 20, the overall and relative dimensions of the valve inlet, the flow control passage, the first valve outlet, the second valve outlet, and the distance between the first valve outlet and the second valve outlet, the amount of convex curvature and the length of the convex curvature in the preferential wall and the second wall of the valve body, and offset amount of the first side 16*a* and second side 16*b* of the flow control passage 16 relative to the valve inlet orifice 26.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A bi-stable valve comprising a valve body that defines: a valve inlet; a flow control passage downstream of the valve inlet; a first valve outlet; a second valve outlet; the first valve outlet and the second valve outlet both downstream of the flow control passage and both fed by the flow control passage; the first valve outlet situated toward a first side of the flow control passage and the second valve outlet situated toward a second opposing side of the flow control passage; the flow control passage defined in part by a preferential wall of the valve body, wherein the preferential wall of the valve body extends along the first side of the flow control passage between the valve inlet and the first valve outlet; the flow control passage further defined in part by a second wall of the valve body, wherein the second wall of the valve body extends along the second opposing side of the flow control passage between the valve inlet and the second valve outlet; and both the preferential wall and the second wall of the valve body having a convex shape over at least a major length of the flow control passage, wherein the convex shape of the preferential wall of the valve body has a greater cumulative curve over the major length of the flow control passage than the second wall of the valve body; wherein the flow control passage has an upstream end adjacent the valve inlet and a downstream end feeding the first valve outlet and the second valve outlet, and wherein the first valve outlet and the second valve outlet are separated by a valve outlet separating wall, wherein the valve outlet separating wall extends toward the valve inlet and terminates at a terminating end at or before the downstream end of the flow control passage.

2. The bi-stable valve of claim 1, wherein:

the valve inlet has a valve inlet length that terminates downstream at a valve inlet orifice; and the second wall of the valve body that extends along the second opposing side of the flow control passage is outwardly offset toward the second opposing side of the flow control passage relative to the valve inlet orifice by an offset amount.

3. The bi-stable valve of claim 2, wherein the offset includes a step between the valve inlet orifice and the second wall of the flow control passage.

4. The bi-stable valve of claim 1, wherein terminating end of the valve outlet separating wall defines a splitter tip.

5. The bi-stable valve of claim 4, wherein the splitter tip includes a bi-cuspid nose with a concave surface between cusps.

6. The bi-stable valve of claim 4, wherein the valve inlet orifice has a first side adjacent the first side of the flow control passage and a second side adjacent the second opposing side of the flow control passage with a valve inlet orifice width defined between the first side of the valve inlet orifice and the second side of the valve inlet orifice, and wherein the splitter tip is spaced downstream of the valve inlet orifice, downstream of the flow control passage, and centered with respect to the valve inlet orifice width.

7. The bi-stable valve of claim 1, wherein the valve inlet has a valve inlet length that terminates downstream at a valve inlet orifice, and wherein the valve inlet tapers inward along at least a major length of the valve inlet length toward the valve inlet orifice.

8. The bi-stable valve of claim 1, wherein:

the first valve outlet has a first valve outlet length and terminates downstream at a first valve outlet orifice;

the second valve outlet has a second valve outlet length and terminates downstream at a second valve outlet orifice;

the first valve outlet is defined in part by a first outside wall that is adjacent to and downstream of the first side of the flow control passage, the first outside wall extending along the first valve outlet length and has a non-convex shape over at least a major length of the first valve outlet length; and the second valve outlet is defined in part by a second outside wall that is adjacent to and downstream of the second opposing side of the flow control passage, the second outside wall extending along the second valve outlet length and has a non-convex shape over at least a major length of the second valve outlet length.

9. The bi-stable valve of claim 8, wherein:

the first outside wall extending along the first valve outlet length is planar over at least a major length of the first valve outlet length; and the second outside wall extending along the second valve outlet length is planar over at least a major length of the second valve outlet length.

10. The bi-stable valve of claim 4, wherein:

the first valve outlet has a first valve outlet length and terminates downstream at a first valve outlet orifice;

the second valve outlet has a second valve outlet length and terminates downstream at a second valve outlet orifice;

the first valve outlet is defined in part by a first outside wall that is adjacent to and downstream of the first side of the flow control passage, the first outside wall extending along the first valve outlet length is planar over at least a major length of the first valve outlet length;

the second valve outlet is defined in part by a second outside wall that is adjacent to and downstream of the second opposing side of the flow control passage, the second outside wall extending along the second valve outlet length is planar over at least a major length of the second valve outlet length;

the first valve outlet is defined in part by the valve outlet separating wall that is on an opposing side of the first valve outlet from the first outside wall, wherein the valve outlet separating wall is planar over at least a major length of the first valve outlet length; and the second valve outlet is defined in part by the valve outlet separating wall that is on an opposing side of the second valve outlet from the second outside wall, wherein the valve outlet separating wall is planar over at least a major length of the second valve outlet length.

11. The bi-stable valve of claim 10, wherein the valve outlet separating wall includes a first valve outlet separating wall segment defining part of the first valve outlet and a second valve outlet separating wall segment defining part of the second valve outlet, wherein the first valve outlet separating wall segment is spaced from the second valve outlet separating wall segment along at least part of the first valve outlet length and the second valve outlet length but are join together at the splitter tip.

12. A bi-stable valve comprising: a valve inlet; a flow control passage downstream of the valve inlet; a first valve outlet; and a second valve outlet; wherein the first valve outlet situated toward a first side of the flow control passage and the second valve outlet situated toward a second opposing side of the flow control passage; wherein the first valve outlet and the second valve outlet both downstream of the flow control passage and both fed by the flow control passage; wherein the flow control passage defined in part by a primary flow surface on the first side of the flow control passage and a secondary flow surface on the second opposing side of the flow control passage, wherein a flow though the valve inlet primarily flows along the primary flow surface and to the first valve outlet at a first back pressure at the first valve outlet, and the flow though the valve inlet primarily flows along the secondary flow surface and to the second valve outlet at a second back pressure at the first valve outlet, wherein the second back pressure is higher than the first back pressure; wherein the primary flow surface has a convex shape over at least a major length of the flow control passage; and wherein the convex shape of the primary flow surface has a greater cumulative curve over the major length of the flow control passage than the secondary flow surface; where in the flow control passage has an upstream end adjacent the valve inlet and a downstream end feeding the first valve outlet and the second valve outlet, and wherein the first valve outlet and the second valve outlet are separated by a valve outlet separating wall, wherein the valve outlet separating wall extends toward the valve inlet and terminates at a terminating end at or before the downstream end of the flow control passage.

13. The bi-stable valve of claim 12, wherein the secondary flow surface has a convex shape over at least the major length of the flow control passage.

14. The bi-stable valve of claim 12, wherein the secondary flow surface is outwardly offset toward the second opposing side of the flow control passage relative to the valve inlet by an offset amount.

15. Abi-stable valve comprising a valve body that defines: a valve inlet; a flow control passage downstream of the valve inlet; a first valve outlet; a second valve outlet; the valve body defining a preferential wall that is convex in shape that draw a flow through the valve inlet primarily towards the first valve outlet, the first valve outlet having a backpressure that is dependent on the flow through the first valve outlet; and the valve body defining a second wall that is convex in shaped to draw the flow through the valve inlet more towards the second valve outlet as the backpressure at the first valve outlet increases, wherein the convex shape of the preferential wall of the valve body has a greater cumulative curve over a major length of the flow control passage than the second wall of the valve body; wherein the flow control passage has an upstream end adjacent the valve inlet and a downstream end feeding the first valve outlet and the second valve outlet, and wherein the first valve outlet and the second valve outlet are separated by a valve outlet separating wall, wherein the valve outlet separating wall extends toward the valve inlet and terminates at a terminating end at or before the downstream end of the flow control passage.

16. The bi-stable valve of claim 15, wherein the second wall is laterally offset from the valve inlet, and the preferential wall is not laterally offset from the valve inlet.

* * * * *